April 10, 1962 J. A. DRAKE 3,028,731
FUEL-AIR RATIO CONTROLLER
Filed Feb. 2, 1955 4 Sheets-Sheet 1
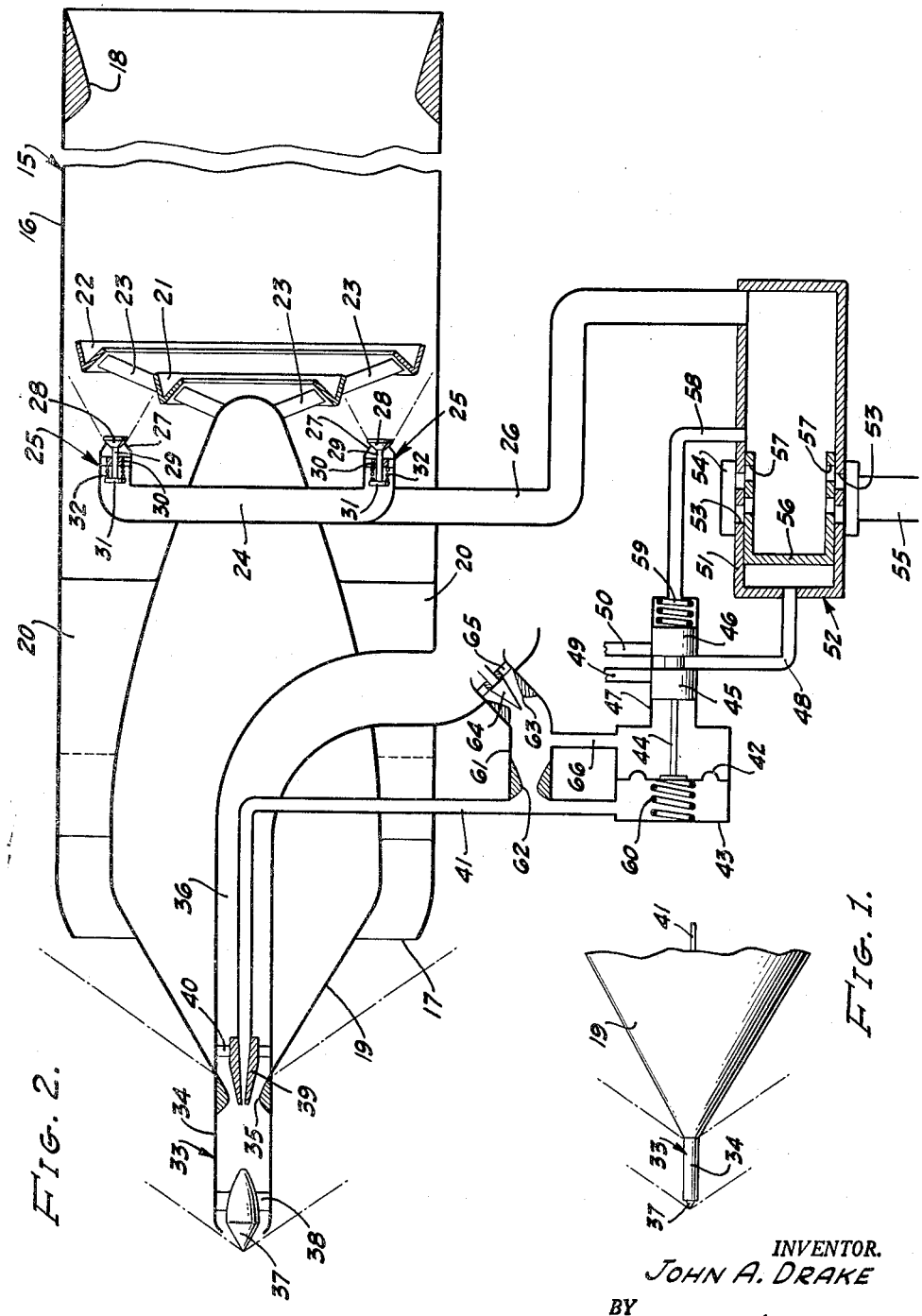
INVENTOR.
JOHN A. DRAKE
BY
R. E. Geauque
ATTORNEY.

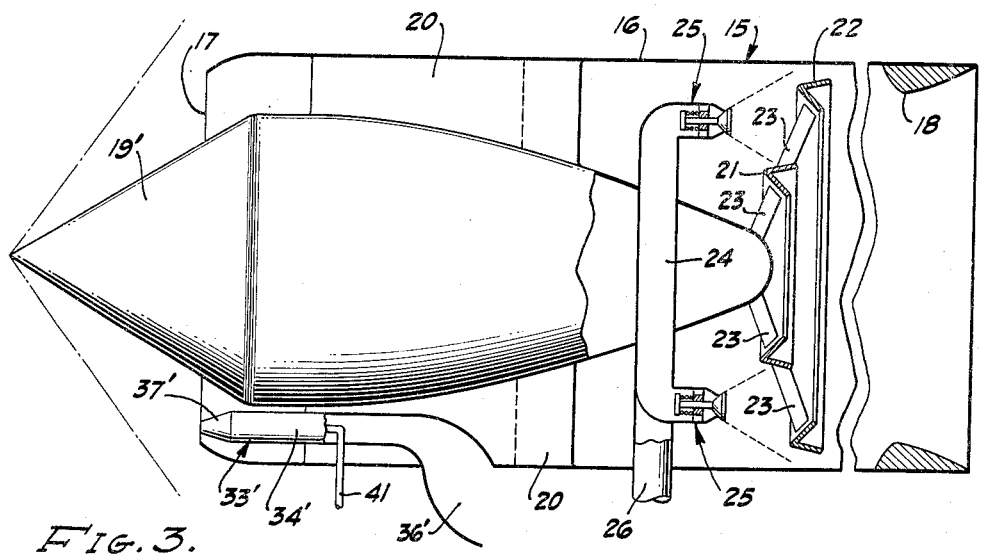
FIG. 3.
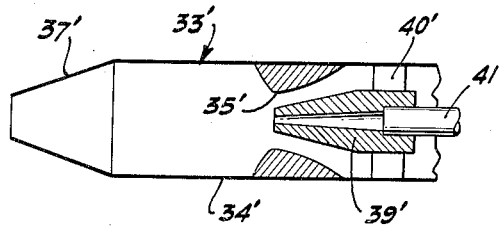
FIG. 4.
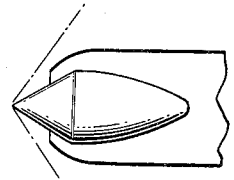
FIG. 5.
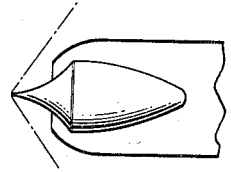
FIG. 6.
FIG. 7.
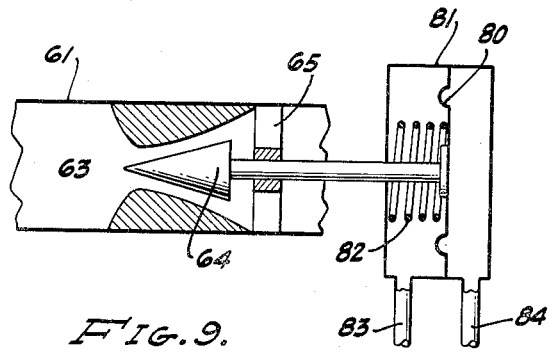
FIG. 9.
INVENTOR.
JOHN A. DRAKE
BY
R. E. Gearque
ATTORNEY.

April 10, 1962   J. A. DRAKE   3,028,731
FUEL-AIR RATIO CONTROLLER
Filed Feb. 2, 1955   4 Sheets-Sheet 3

INVENTOR.
JOHN A. DRAKE
BY
R. E. Geangue
ATTORNEY.

$$\frac{A_1}{A_3}P'_{T_0} + \frac{A_2}{A_3}P_{T_1}$$

3,028,731
FUEL-AIR RATIO CONTROLLER
John A. Drake, Van Nuys, Calif., assignor to The Marquardt Corporation, a corporation of California
Filed Feb. 2, 1955, Ser. No. 485,759
6 Claims. (Cl. 60—39.28)

This invention relates to a fuel-air ratio controller for a jet engine, such as a ramjet, and more particularly to a device for maintaining the fuel-air ratio of a jet engine at about a constant stoichiometric or full rich value in the higher Mach number ranges and at a value lower than the constant stoichiometric value in the lower Mach number ranges where a lower fuel-air ratio is required to ignite the engine, avoid "buzz" (diffuser instability) and avoid possible rough operation at the full rich mixture. Such lower value is required during subcritical operation of the diffuser with the normal shock forward of the diffuser lip.

It has been determined that there is a tolerable range of fuel-air ratio for a jet engine at any given Mach number, either within the subcritical or supercritical operation range of the diffuser, and unless the fuel-air ratio is held within this range, unsatisfactory operation of the engine will result during subcritical operation and maximum thrust cannot be obtained during supercritical operation. The present invention provides a device for scheduling the fuel-air ratio within the tolerable range in accordance with Mach number to maintain low values during subcritical operation and to maintain a substantially constant stoichiometric value during supercritical operation. At the higher Mach numbers, the stoichiometric fuel-air ratio results in maximum thrust needed to accelerate the jet propelled aircraft. The change in the form of schedule in going from subcritical to supercritical operation is accomplished without the necessity of utilizing complicated mechanisms for sensing the position of the normal shock. In prior devices, the change in pressure resulting as the normal shock moves past the diffuser lip must be measured so that the proper change in schedule can be accomplished in going from subcritical to supercritical operation. The words "schedule" and "scheduling" are used herein to define the relationship between two variable quantities.

The present invention utilizes a pressure computer which can be in the form of a miniature engine similar in construction to the main engine or can be formed of a simple pressure probe. The pressure computer can be located at the nose of the main engine diffuser, or at the entrance of the engine diffuser, or at other locations in the engine or airplane and in some forms of the invention, two or more computers can be utilized to obtain a single control pressure from the pressures at various locations of the main engine, such as at the diffuser nose and at the diffuser entrance. If a diffuser body is utilized in the pressure computer, it can be of the same form as the diffuser body for the main engine, but other configurations of diffuser bodies can also be used. The pressure computer provides a pressure signal which is utilized to control the fuel flow to the main engine and thus to control the fuel-air ratio for the main engine. This pressure signal is obtained from the nozzle end of the computer or from the single pressure behind the nozzles of a plurality of computers when more than one computer is utilized to provide a control signal.

The air flow through the main engine is proportional to the total pressure ($P_{t_5}$) at the exit nozzle and to the reciprocal of the square root of total temperature ($T_{t_5}$) at the exit nozzle. Thus, if the fuel flow to the engine is controlled in proportion to pressure $P_{t_5}$ only, the fuel-air ratio will not be exactly proportioned to air flow through the engine since changes in the value of total temperature are not measured. However, in typical flight trajectories and at nearly stoichiometric fuel-air ratios, total temperature ($T_{t_5}$) which changes only with changes in flight speed, altitude and combustion efficiency, does not vary greatly from an average value. Thus, fuel flow will be lower than required to give a constant fuel-air ratio during subcritical operation and will be slightly higher than required for a constant fuel-air ratio during supercritical operation. However, during supercritical operation, the fuel-air ratio will be maintained substantially constant. Fuel flow cannot be metered in proportion to the actual engine $P_{t_5}$ in order to obtain constant fuel-air ratio since the resultant control system would be unstable; an increase $P_{t_5}$, signalling an increase in air flow would cause an increase in fuel flow to raise the fuel-air ratio. This increase would then increase $P_{t_5}$ further by driving the engine normal shock further forward in the diffuser, the process thus uncontrollably raising the fuel-air ratio. However, if the pressure computer has a diffuser body in the same form as the main engine, the pressure at the exit nozzle of the computer will be nearly the same as in the main engine and thus an approximation of $P_{t_5}$ for the main engine can be measured in the pressure computer for control purposes and a stable fuel-air ratio regulating device can be devised. The system would be stable since when engine fuel-air ratio is increased in response to an increased $P_{t_5}$ signal, the normal shock in the pressure computer is not driven further forward in the pressure computer diffuser. However, if the diffuser body for the pressure computer is of a different form than the diffuser of the main engine, the pressure at the nozzle exit of the computer at any given flight Mach number will differ from $P_{t_5}$ by an amount depending upon the form of the computer diffuser body. Thus, the schedule of fuel-air ratio can be varied by changing the form of computer diffuser body or by eliminating the diffuser body and the different schedules so obtained will not give a constant fuel-air ratio since the value of $T_{t_5}$ in the main engine resulting from the combustion of fuel is not compensated for. Thus, the control pressure for any selected schedule does not represent actual air flow through the main engine. By utilizing a single control pressure obtained from a number of pressure computers located at different locations in the main engine, other control schedules of fuel-air ratio can be obtained which differ from the schedules obtained by eliminating or varying the form of diffuser for the pressure computer.

It is therefore an object of the present invention to provide a fuel-air ratio controller for a jet engine which provides a substantial constant value of fuel-air ratio at higher flight Mach numbers and a lower value than the constant value at lower flight Mach numbers.

Another object of the invention is the provision of a fuel-air ratio controller which governs the fuel flow to the engine solely in accordance with a control pressure which alone does not represent the actual air flow through the engine.

Another object of the invention is to provide a controller which utilizes a pressure computer to obtain a control pressure from an engine pressure for the purpose of scheduling the fuel flow to the engine in accordance with a schedule determined by the construction of the pressure computer.

A further object of the invention is to provide a ratio controller having a pressure computer for obtaining a false value of one quantity of the ratio so that the other quantity is varied in accordance with the false value rather than the true value.

A still further object of the invention is to provide a pressure computer in the form of a through flow engine in which the inlet geometry of the computer can be varied to vary the schedule of the computer discharge pressure against Mach number of incoming fluid.

Another object of the invention is to provide a ratio controller having a number of pressure computers each receiving a different pressure, which are combined by the computer to obtain a control pressure different from any one of the pressures received by the computers.

These and other objects of the invention, not specifically set forth above will become readily apparent from the accompanying description and drawings in which:

FIGURE 1 is a diagrammatic view showing the relative size of the main engine diffuser to the pressure computer located at the nose of the main engine diffuser.

FIGURE 2 is a diagrammatic view of a ramjet engine illustrating the fuel-air ratio controller for controlling the fuel flow to the engine and showing the pressure computer of FIGURE 1 enlarged with respect to the main engine diffuser for purposes of illustration.

FIGURE 3 is a diagrammatic view of a second form of the invention wherein the pressure computer is located at the entrance of a ramjet engine.

FIGURE 4 is a diagrammatic view of the pressure computer construction utilized with the form of invention shown in FIGURE 3.

FIGURE 5 is a diagrammatic view of another form of diffuser construction which can be utilized in the pressure computer of FIGURES 1 and 3 and which consists of a conical diffuser associated with a restricted engine entrance.

FIGURE 6 is a diagrammatic view of another form of diffuser construction which can be utilized in the pressure computer of FIGURES 1 and 3 and which consist of an isentropic diffuser body.

FIGURE 7 is a diagrammatic view of still another form of diffuser construction which can be utilized in the pressure computer of FIGURES 1 and 3 and which consists of a normal shock engine entrance.

FIGURE 9 is a diagrammatic view of a control device for varying the throat area of a discharge orifice connected to the control pressure in all forms of the invention.

Figure 8:
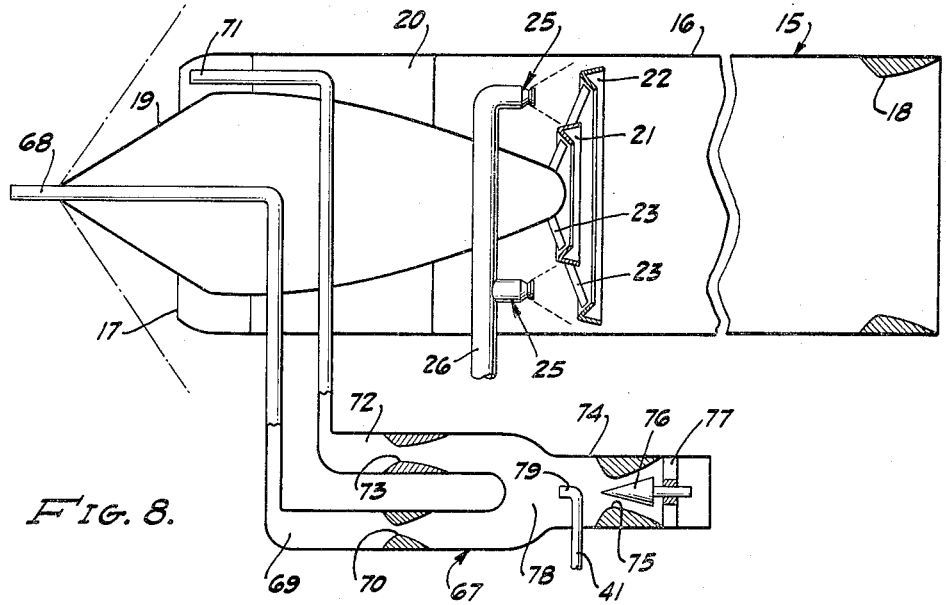
FIGURE 8 is a diagrammatic view of a third form of the invention which utilizes a pair of pressure probes, one located at the nose of the diffuser and the other located at the engine entrance, in order to obtain a single control pressure by use of a common exhaust orifice.

Referring now to the first form of the invention illustrated in FIGURES 1 and 2, a ramjet engine 15 has a cowling 16 with an inlet 17 and an exit nozzle 18. A conical diffuser body 19 is supported within the inlet by struts 20 so that the conical nose of the diffuser projects forwardly of the inlet 17. A flame holder is located behind body 19 and is comprised of circular rings 21 and 22 of V-shaped cross section which are supported by body 19 by means of struts 23. A fuel manifold 24 surrounds the diffuser body forwardly of the flame holder and connects a number of fuel injectors 25 with the main fuel line 26. Each of the fuel injectors terminates in a nozzle end 27 which cooperates with a conically shaped valve 28 to control the fuel flow to the engine. Each valve 28 has a stem 29 passing through a support 30 and a disk 31 is carried at the end of stem 29 so that spring 32, positioned between the support and the disk, biases the valve toward closed position. With this type of fuel injector, the fuel flow to the engine is approximately directly proportional to the fuel pressure in line 26 since the back pressure in the engine is very small in proportion to the fuel pressure.

The nose of the diffuser body carries pressure computer 33 which consists of a duct 34 of the same proportions as duct 16 of the main engine but very much smaller. The relative size of the ducts 16 and 34 is illustrated in FIGURE 1 and the size of duct 34 in FIGURE 2 has been increased for purposes of illustration. An exit nozzle 35 similar to nozzle 18, is located at the aft end of duct 34 and this nozzle exhausts to a passage 36 which leads through the diffuser body 19 and cowling 16 to atmosphere. A conical diffuser body 37, similar in shape to body 19, is supported at the entrance of duct 34 by struts 38 so that the same diffuser action takes place in the main engine and in the pressure computer. Thus, the only difference in the construction of the pressure computer and the main engine is that the pressure computer has no fuel injectors or flame holders.

A tapered pressure probe 39 is supported by struts 40 in position to sense the total pressure at the throat of orifice 35 and this control pressure $P_{t_5}$ is transmitted through passage 41 to one side of diaphragm 42 located in casing 43. The throat area of orifice 35 can be varied by axial movement of tapered probe 39 in a manner that the probe 39 can be locked in any selected position.

A stem 44 connects the diaphragm 42 with valve portions 45 and 46 contained within casing 47 and valve portions control the fluid flow between passage 48 and high and low fluid pressure supply lines 49 and 50, respectively. The passage 48 connects with one end of casing 51 of the fuel valve 52 and the casing contains a plurality of circumferential openings 53. Fuel is supplied to openings 53 from an annular chamber 54 connecting with the fuel supply line 55. A piston 56 is snugly received within casing 51 for movement relative to the casing and a plurality of circumferential openings 57 are located in the wall of the piston so that the openings 57 can cooperate with the openings 53 to control the quantity of fuel flowing to the interior of casing 51 and to the main fuel line 26 connected thereto. The pressure of the fuel within the interior of casing 51 acts against one side of piston 56 while the fluid pressure in passage 48 acts against the other side of the piston and when these pressures balance, the fuel supply to the engine will be constant at a value determined by the relative position of openings 53 and 57. The larger the passage defined by these openings, the greater will be the fuel flow and the fuel pressure within casing 51.

A passage 58 connects the interior of casing 51 with casing 47 so that the fuel pressure acts against the surface of valve portion 46. Also, a coil spring 59 acts against this valve portion while a coil spring 60 acts against diaphragm 42 in a direction to oppose spring 59. Thus, springs 59 and 60 serve as centering springs for the valve portions. A pressure divider device, such as disclosed in U.S. Patent No. 2,645,240 dated July 14, 1953, to John A. Drake, is connected between passage 41 and atmosphere and consists of a passage 61 having an orifice 62 at its entrance and an orifice 63 at its exit. The throat area of orifice 63 can be varied by needle valve 64 supported by struts 65 in a manner that the valve can be locked in any selected position. The difference in pressure between passage 41 and atmosphere is sufficient to cause sonic velocity flow at the throat of the orifices at flight speeds in the transonic and supersonic region or in other words, is sufficient to choke both the orifices. Under such conditions, the pressure in passage 61 intermediate the orifices is a function of the pressure in passage 41 and the ratio of the throat area of orifice 63 to the throat area of orifice 62. When this ratio is fixed, the intermediate pressure will be a fixed fraction of the control pressure in passage 41 and this fractional pressure is connected through passage 66 to the opposite side of diaphragm 42 from that which is connected to the control pressure. Thus, as the control pressure $P_{t_5}$ in passage 41 varies, the pressure differential on diaphragm 42 will also vary proportionally. The fuel pressure in passage 58 acts to balance the differential pressure on diaphragm 42 in order to null the valve portions 45 and 46. If the fuel pressure is lower than called for by the control pressure, the valve positions will move to the right in FIGURE 2 to connect low pressure line 50 with passage 48 and cause piston 56 to be moved to the left by the fuel pressure in casing 51 until the passage defined by openings 53 and 57 is large enough to increase the fuel pressure and again null the valve portions. If the fuel pressure is too high, the valve portions will move to the left to connect high pressure supply line 49 with passage 48 and cause the piston 56 to move to the right and reduce the fuel pressure. As previously stated, the fuel flow through fuel nozzle 25 is substantially proportioned to the pressure in line 26 and since this pressure is controlled in proportion to the control pressure $P_{t_5}$, the fuel flow will be proportioned to the control pressure.

Figure 10:
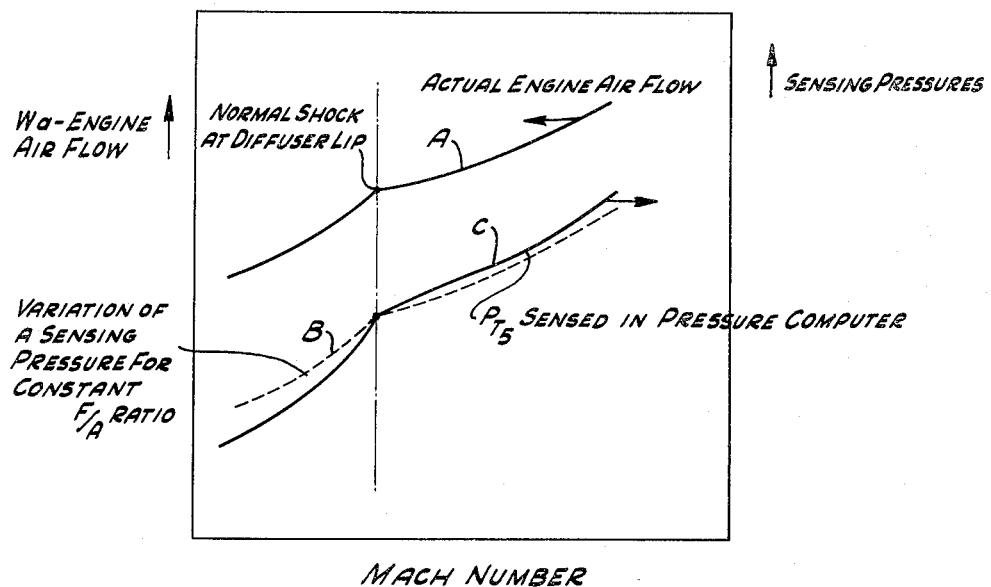
FIGURE 10 is a plot of actual engine air flow against flight Mach number and a plot, against Mach number, comparing the pressure sensed in the pressure computer of FIGURE 2 with the theoretical senser pressure required for a constant fuel-air ratio.

Since the diffuser bodies 19 and 37 of the main engine 15 and pressure computer 33 respectively, are of the same shape, the control pressure $P_{t_5}$ in passage 41 will be approximately the same as the pressure $P_{t_5}$ in the main engine at all Mach numbers. The actual air flow through the main engine can be represented by the following equation $$W_a = \frac{KP_{t_5}}{\sqrt{T_{t_5}}}$$

where K is a constant, $P_{t_5}$ is the total pressure at the throat of nozzle 18 and $T_{t_5}$ is the total temperature at the throat of nozzle 18. Referring to FIGURE 10, curve A represents the usual form of curve for engine air flow versus Mach number for an engine having a conical diffuser similar to diffuser 19. The dashed curve B represents the variation of control pressure with Mach number which would be required in the present invention to maintain a constant fuel-air ratio. In other words, the control pressure represented by curve B would be proportional to the quantity $$\frac{P_{t_5}}{\sqrt{T_{t_5}}}$$

of the engine. The variation in actual control pressure $P_{t_5}$ measured by the pressure computer 33 is represented by curve C of FIGURE 10. The difference between curves B and C results from the fact that the pressure computer does not correct for the variation in $T_{t_5}$ taking place in the main engine 15 because of the fuel burned in the actual engine or for the variation in $P_{t_5}$ of the main engine 15 at a given Mach number and altitude because of the change in engine pressure losses due to variations in $T_{t_5}$.

Figure 11:
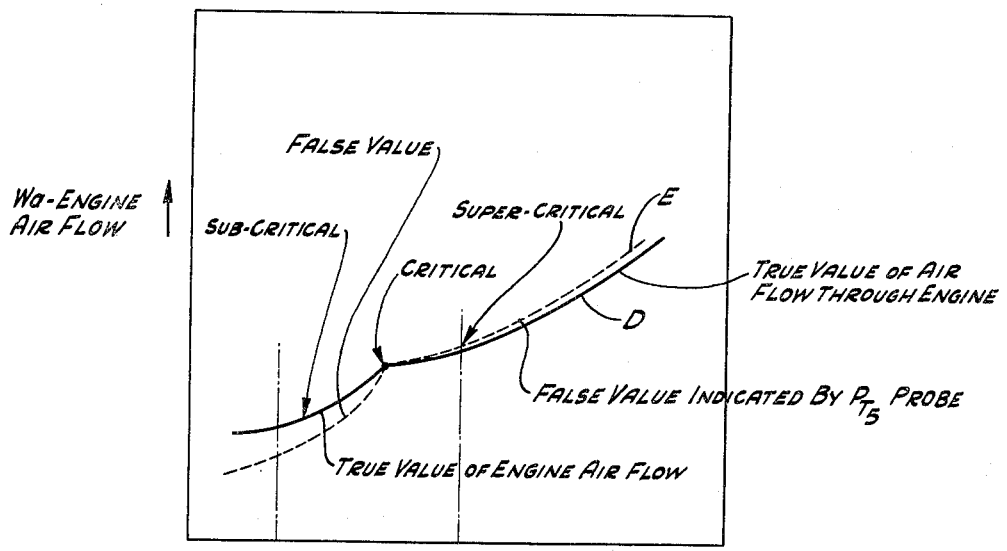
FIGURE 11 is a plot against the pressure $P_{t_5}$ sensed by the computer showing the relationship between actual engine air flow and the false value of engine air flow indicated by the sensed pressure.

Referring to FIGURE 11, curve D represents the variation in control pressure $P_{t_5}$ which would be required to represent the actual air flow through the engine while curve E represents the false air flow through the engine indicated by the values of $P_{t_5}$ measured by the pressure computer. In other words, in the subcritical range of operation, the control pressure $P_{t_5}$ indicates a lower value of air flow through the engine than actually exists as represented by the spread between curves D and E in this range. Thus, the control pressure calls for a lower fuel pressure and fuel flow to the engine through valve 52 than would be required to produce the constant fuel-air ratio which would result if pressure $P_{t_5}$ were proportional to the actual air flow. In the super-critical range of operation, the curve E represents a slightly greater air flow through the engine than actually exists but the curves D and E are so nearly the same that the control pressure $P_{t_5}$ calls for a fuel flow which produced substantially a constant fuel-air ratio. Thus, the form of invention illustrated in FIGURE 2 results in the desired schedule of fuel-air ratio in that the ratio is maintained substantially constant in the higher Mach number ranges and is less than constant value in the lower Mach number ranges. It will be noted that the curves D and E intersect at a point corresponding to critical operation of the engine diffuser when the normal shock is at the diffuser lip.

Referring to a second form of the invention wherein like reference numerals designate like parts, FIGURE 3 shows a ram jet engine 15 which is equipped with exit nozzle, flame holder, fuel manifold and injector nozzles identical in construction with those of FIGURE 2. The engine also has a diffuser body 19' which is of the same configuration as diffuser body 19 of FIGURE 2 except that body 19' is closed at the nose. A pressure computer 33' is supported at the diffuser lip by engine strut 20 and the computer is comprised of a duct 34' having an exit nozzle 35' connecting with passage 36' leading to atmosphere. A pressure probe 39' is positioned at the throat of the exit nozzle by struts 40' to measure the control pressure $P_{t_5}$. The passage 41 connects the probe 39' with the fuel valve controller of FIGURE 2 so that the control pressure from pressure computer 33' will regulate the fuel flow in the main fuel line 26. The construction of computer 33' is shown enlarged in FIGURE 4.

The computer 33' located at the diffuser lip of the engine receives the same pressure as computer 33 and both computers exhaust to atmosphere. The supersonic inlet 37' of computer 33', however, is of the normal shock or Kantiowitz type in contrast to the conical shock or Ferri type of inlet in computer 33. Therefore, the control pressure $P_{t_5}$ measured by computer 33' will be the same as that measured by computer 33 for all flight Mach numbers and curves of FIGURES 10 and 11 also represent the operation of the second form of the invention. Thus, by locating the pressure computer at the diffuser lip, the desired schedule of fuel-air ratio can be obtained since the ratio will be maintained substantially constant during supercritical operation and at less than the constant value during subcritical operation.

Other types of diffusers can be utilized for the pressure computers 33 and 33' without changing the diffuser design of the engine. For example, any one of the diffusers illustrated in FIGURES 5 through 7 could be utilized in either pressure computer. By varying the form of the diffuser, the shape of curve C in FIGURE 10 can be varied to obtain various schedules of fuel-air ratio which depart from the constant fuel-air ratio schedule and a diffuser design can be selected to give a desired schedule. In other words, by changing the diffuser design of the pressure computer, the control pressure $P_{t_5}$ will indicate a different false air flow through the main engine so that a different fuel-air ratio will result from the action of the controller for the fuel valve. FIGURE 5 represents a diffuser having a conical body and a restricted passage at the diffuser lip while FIGURES 6 and 7 illustrate, respectively, an isentropic type and a normal shock type of diffuser. Each of the diffuser designs have a different pressure recovery and thus a different curve of control pressure $P_{t_5}$ versus Mach number. By changing the diffuser design, various schedules of fuel-air ratio can be obtained which depart in various amounts from a constant fuel-air ratio schedule in both the subcritical and supercritical range of operation.

Referring to another form of the invention, wherein like reference numerals indicate like parts as in the previous embodiments, FIGURE 8 illustrates a main engine 15 having an exit nozzle, flame holder, fuel injector and diffuser similar in construction to those of the previous forms. The pressure computer 67 has a flight total pressure probe 68 mounted in the nose of diffuser body 19 and this probe connects with a passage 69 which contains an orifice 70 having cross sectional area at the throat $A_1$. A second pressure probe 71 is located at the diffuser lip and connects with a passage 72 containing an orifice 73 having cross sectional area at the throat $A_2$. Both orifices 70 and 73 exhaust to a common passage 74 which contains an orifice 75 having cross sectional area at the throat $A_3$, and an adjustable needle valve 76 is supported within the orifice 75 by struts 77 to adjust the throat area thereof. The passage 74 discharges to atmosphere and the pressures from probes 71 and 68 are sufficiently high to choke the orifices 70, 73 and 75. Thus, the pressure probe 67 is in the form of a compound pressure divider in which the pressure in space 78 will be the sum of the pressures which would result intermediate orifices 70 and 75 and intermediate orifices 73 and 75 if the intermediate spaces were not connected together to form space 78. A probe 79 is located in space 78 and measures the pressure $$\left(\frac{A_1}{A_3}\right)P'_{t_0} + \left(\frac{A_2}{A_3}\right)P_{t_1}$$

where $$\left(\frac{A_2}{A_3}\right)P_{t_1}$$

is the fraction of pressure $P_{t_1}$ resulting from the pressure divider action between orifices 73 and 75 and $$\left(\frac{A_1}{A_3}\right)P'_{t_0}$$

is the fraction of pressure $P_{t_0}$ resulting from the pressure divider action between orifices 70 and 75. The probe 75 connects with passage 41 so that the controller system shown in FIGURE 2 will regulate the fuel flow to passage 26 in accordance with the control pressure measured by probe 79.

Figure 12:
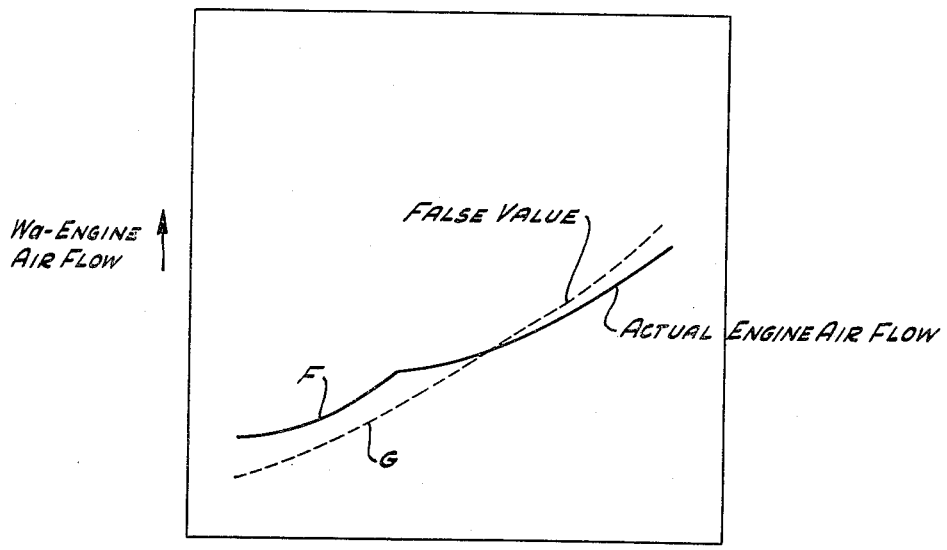
FIGURE 12 is a plot similar to FIGURE 11 showing comparison of actual and false values of engine air flow plotted against the pressure sensed by the form of the invention illustrated in FIGURE 8.

Referring to FIGURE 12, curve F represents the variation in control pressure which would be required to maintain a constant fuel-air ratio for the engine and this curve is the same as curve D of FIGURE 11. The curve G represents the actual variation in control pressure from pressure computer 67 and it is apparent that this control pressure represents a false air flow through the engine which is less than the actual air flow until after supercritical operation results. At high Mach numbers, however, the control pressure represents a false air flow through the engine which is higher than the actual air flow. By comparing curve G of FIGURE 12 with curve E of FIGURE 10, it is seen that the form of invention illustrated in FIGURE 8 provides a different schedule of fuel-air ratio than provided by the forms of the invention illustrated in FIGURES 2 and 3. It is understood that the pressure probes 68 and 71 can measure any two pressures in the main engine or aircraft which change with air flow through the engine and by combining these pressures, different control pressures can be obtained. Also, more than two pressures can be taken from the engine and combined in pressure computer 67 to change the fuel-air ratio schedule and, of course, only one pressure can be taken from the engine or aircraft and introduced to a pressure divider system to obtain a still different schedule.

While the needle valve 64 in the controller system can be fixed in any position to give a fixed throat area for orifice 63, it is possible to vary the position of the needle valve and the throat area in accordance with some variable in the engine in order to vary the schedule of fuel-air ratio with this variable. For this purpose, referring to FIGURE 9, the needle valve 64 has its stem connected to a diaphragm 80 contained in casing 81. One side of the diaphragm receives the pressure of spring 82 and the pressure $P_a$ from passage 83 while the other side of the diaphragm receives the pressure $P_b$ from passage 84. The pressure $P_a$ can be derived from the pressure $P_b$ in the same manner as the pressure in passage 66 is derived from the pressure in passage 41 of FIGURE 2 or the pressures $P_a$ and $P_b$ could be derived from two different positions within the engine or aircraft. By varying the position of needle valve 64 with diaphragm 80, it is possible to modify the schedule of fuel-air ratio obtained in all forms of the invention since the pressure differential across diaphragm 42 of the controller is modified by varying the throat area of orifice 63.

By the present invention, a fuel-air ratio controller for a jet engine is provided in which a control pressure is obtained from one or more pressures of the engine or aircraft through the use of a pressure computer. The curve of control pressure versus flight Mach number can be varied by utilizing a pressure probe in connection with a pressure divider or by utilizing a miniature engine as the pressure computer and when a miniature engine is used, the control pressure curve can be varied by changing the geometry of the diffuser. The invention operates upon the principle that the variation in control pressure from the computer can be utilized to control the fuel flow to the engine in accordance with a selected schedule since the fuel flow can be governed in accordance with the false value of air flow indicated by the control pressure. In the case where pressure $P_{t_5}$ in the miniature engine is utilized as the control pressure, the air flow indicated by the control pressure is in error by a factor representing the total temperature associated with pressure $P_{t_5}$ in the main engine. This error is such that the fuel-air ratio is substantially constant during supercritical operation but the ratio is less than the constant value during subcritical operation. This fuel-air ratio schedule is highly desirable since it permits smooth operation of the engine within the subcritical range and permits maximum thrust output within the supercritical range. All forms of the invention utilize the same controller system to control the fuel flow in accordance with the control pressure from the pressure computer but other types of controller systems can be utilized as long as the system gives a fuel pressure proportional to the control pressure. It is understood that more than one miniature engine can be utilized to obtain a single control pressure in a compound pressure divider. Various other modifications are contemplated by those skilled in the art without departing from the spirit and scope of the invention as hereinafter defined by the appended claims.

What is claimed is:

1. A fuel-air ratio controller for an aircraft jet engine having a diffuser and exit nozzle and fuel injectors located therebetween, comprising a miniature engine located on said aircraft and comprising a miniature diffuser and a miniature exit nozzle, passage means for connecting said miniature exit nozzle to atmosphere, a pressure probe located at the throat of said miniature exit nozzle to obtain a control pressure, a fuel valve for controlling the fuel flow through said injectors and means responsive to said control pressure for actuating said fuel valve to obtain a fuel flow proportional to said control pressure.

2. A fuel-air ratio controller as defined in claim 1 wherein said miniature engine is located at the nose of the engine diffuser and said miniature diffuser and exit nozzle have the same geometry as the engine diffuser and exit nozzle so that approximately the same pressure exists at the throats of both the miniature and engine exit nozzles.

3. A fuel-air ratio controller as defined in claim 1 wherein said miniature engine is located at the lip of the engine diffuser, and said miniature engine having a normal shock diffuser.

4. A fuel-air ratio controller as defined in claim 1 wherein said last mentioned means comprises a diaphragm receiving said control pressure on one side thereof, pressure divider means connected between said control pressure and atmosphere and comprising an inlet and an outlet orifice, the pressure between said orifices being communicated to the other side of said diaphragm and means for varying the throat area of said outlet orifice to vary the response of said diaphragm to said control pressure.

5. A fuel-air ratio controller for an aircraft jet engine having a diffuser and an exit nozzle comprising means for obtaining a control pressure having different values at each flight Mach number and representing a false value of air flow through the engine at each Mach number, and means for changing the fuel flow to the engine upon change in said control pressure to obtain a desired schedule of fuel-air ratio with flight Mach number, said first mentioned means comprising a miniature engine having a diffuser and an exit nozzle, and means for measuring the total pressure at the throat of said miniature engine exit nozzle to obtain said control pressure.

6. A fuel-air ratio controller as defined in claim 5 wherein the miniature engine has the same geometry as the jet engine so that the air flow represented by the control pressure is in error by the factor proportional to total temperature at the exit nozzle of said jet engine.

References Cited in the file of this patent
UNITED STATES PATENTS

| | | |
|---|---|---|
| 2,550,678 | Deacon | May 1, 1951 |
| 2,564,127 | Orr | Aug. 14, 1951 |
| 2,642,237 | Page et al. | June 16, 1953 |
| 2,693,675 | Schaffer | Nov. 9, 1954 |
| 2,746,242 | Reed | May 22, 1956 |
| 2,766,579 | Gallo et al. | Oct. 16, 1956 |
| 2,855,753 | McLafferty | Oct. 14, 1958 |